UNITED STATES PATENT OFFICE.

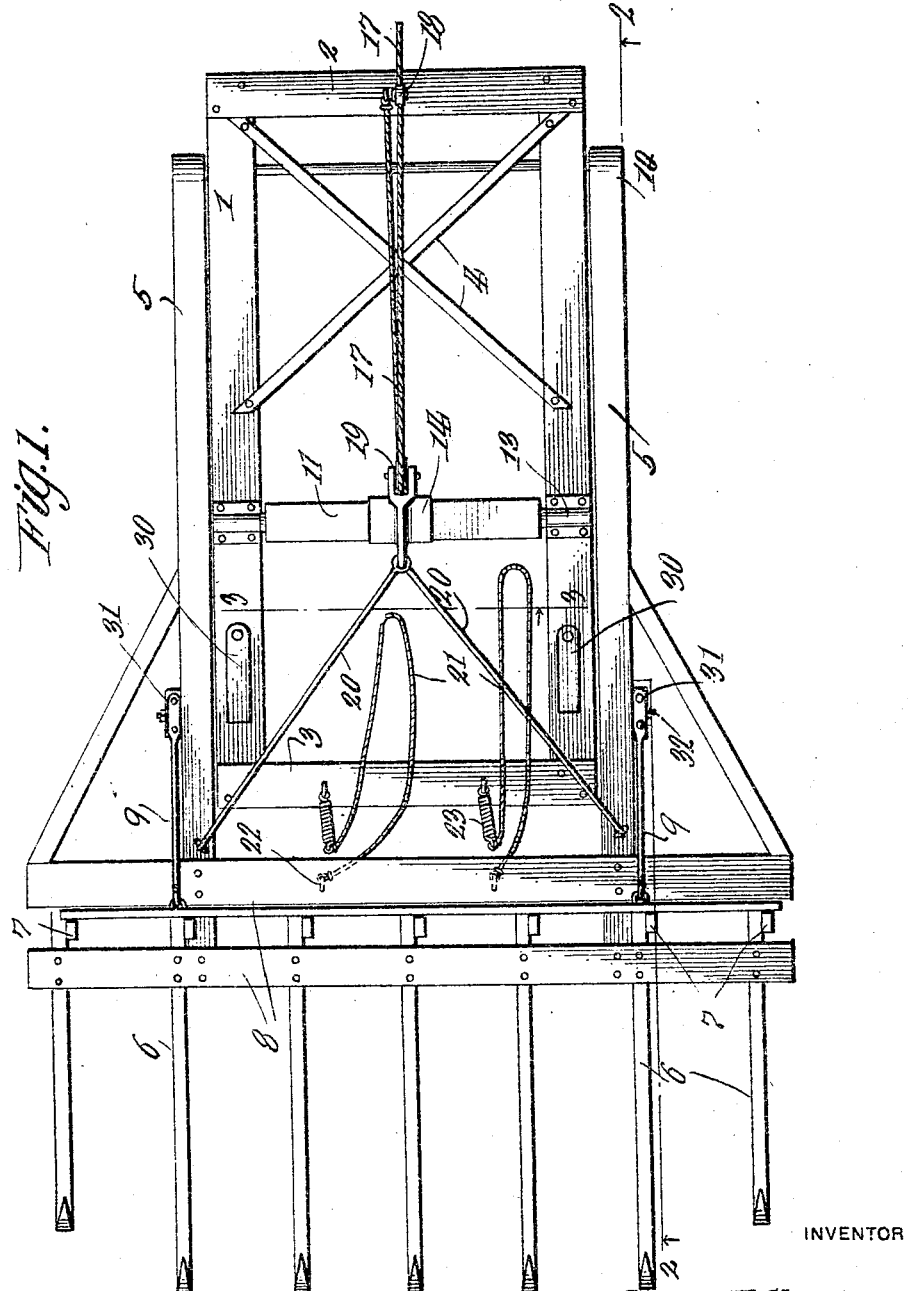

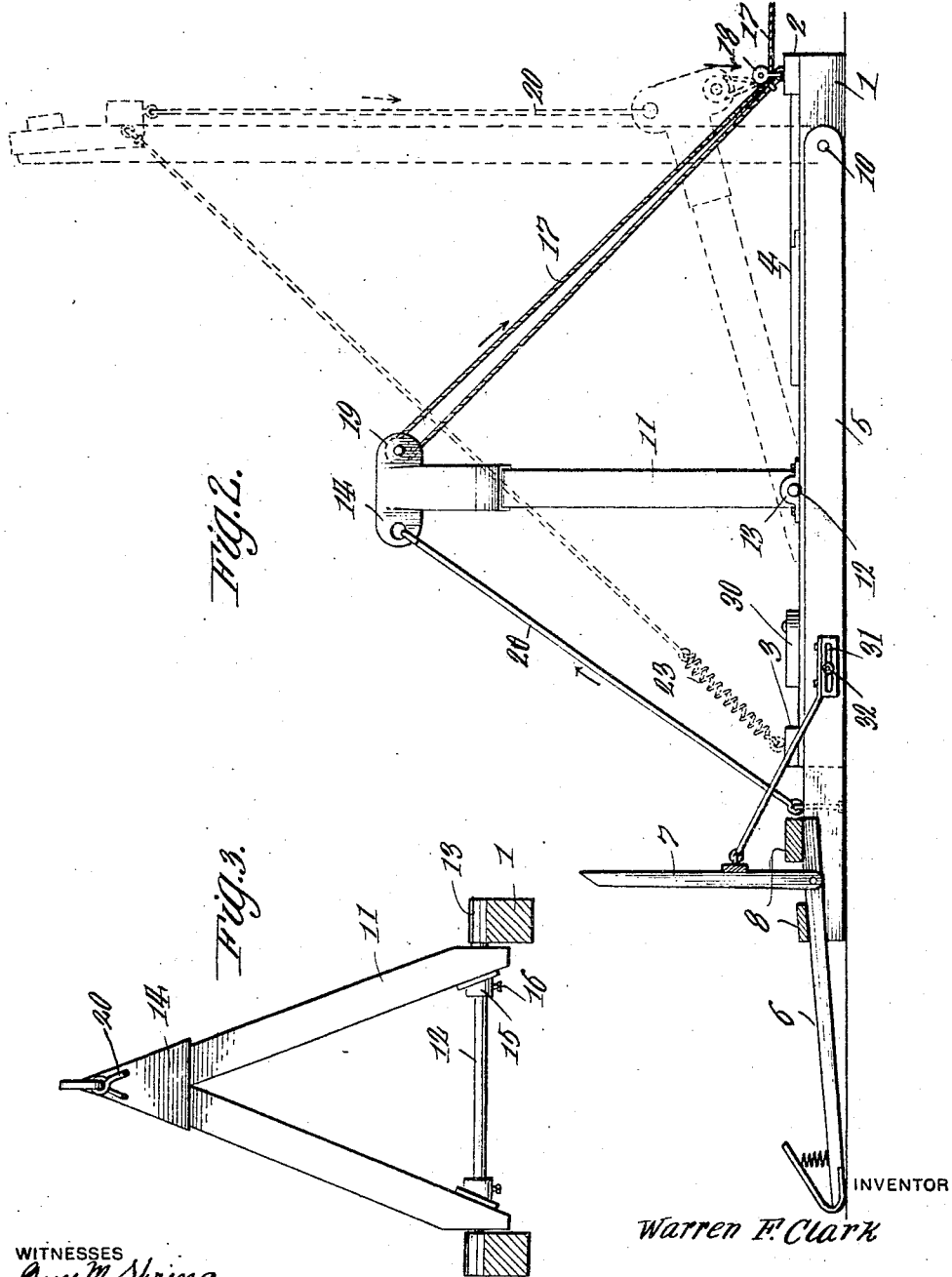

WARREN FRANKLIN CLARK, OF BORUP, MINNESOTA.

HAY-STACKER.

1,285,624. Specification of Letters Patent. Patented Nov. 26, 1918.

Application filed July 5, 1918. Serial No. 243,399.

*To all whom it may concern:*

Be it known that I, WARREN F. CLARK, a citizen of the United States, residing at Borup, in the county of Norman and State of Minnesota, have invented certain new and useful Improvements in Hay-Stackers, of which the following is a specification.

This invention relates to hoisting, and more especially to hay stackers; and the object of the same is to produce means for connecting the draft with the pivoted fork so that the latter will be raised at a speed increasing with its rise and checked rather suddenly to toss the hay or the shock up onto the stack.

Another object is to provide means for starting the fork automatically backward after it has delivered its load, and yet another object is to utilize this rearward movement of the fork to reset the draft mechanism for the next impulse.

Other objects are brought out in the following specification and claims, and reference is made to the drawings, wherein:—

Figure 1 is a plan view of this machine complete,

Fig. 2 a longitudinal section on the line 2—2 of Fig. 1, and

Fig. 3 a cross sectional detail on the line 3—3 of Fig. 1.

The machine comprises a base, a fork hinged thereto, and the operating mechanism. The base includes two spaced sills 1 connected by front and rear cross bars 2 and 3 and suitably braced as at 4, and it is not inconsistent with my invention that the sills should constitute runners or perhaps be mounted on a low running gear in order that the device may be transported from point to point. This detail is not illustrated as it forms no feature of the invention itself.

The fork consists of two long arms 5 and a head including tines 6, fingers 7 at right angles thereto, and appropriate cross bars and braces 8 and 9. The arms 5 extend alongside the sills 1 and are hinged or pivoted at 10 at the front ends of both, whereas the head of the fork stands entirely to the rear of the rear cross bar 3. Normally the head lies upon the ground in rear of the base as seen in Fig. 1 and in full lines in Fig. 2, and when a shock or a bundle of hay has been placed upon the tines 6, the fork must be swung upward to the position indicated in dotted lines in Fig. 2 and checked rather quickly when it reaches that position so that the load on the tines and sustained there by the fingers 7 will be tossed up onto the hay stack or perhaps into the loft as the case may be; after which the fork returns to its original position for the reception of another load.

At about the mid-length of the base I mount a strut, shown in Fig. 3 as composed of downwardly diverging legs 11 mounted at their lower ends on a transverse rod 12 whose extremities are supported in bearings 13 on the sills of the base, and these legs are connected at their upper ends to a head 14 which may be a casting of the shape best seen in Fig. 2. For disconnecting the parts, as desirable during transportation or when the machine is to be stored, the legs may be mounted on the rod or shaft 12 by means of washers 15 shaped to fit their inner faces and held in place by set screws 16 or otherwise, and when the latter are loosened, the shaft or rod can be drawn longitudinally out of the bearings 13 and the parts separated. A draw rope 17 leads under a pulley 18 on the front cross bar 2 and is connected with the head 14. Preferably it passes over a pulley 19 in the front side of said head and downward and is attached to the cross bar 2 so as to increase the power while decreasing the speed. Tension on this rope swings the strut forward on its pivot 12 which is so disposed in rear of the pulley 18 that the strut will move down practically onto the latter as shown in dotted lines in Fig. 2. The rear end of the head 14 is connected by a link 20 with the fork-head, preferably by making this link in the form of a fork as seen in Fig. 1 and attaching its center in an eye in the head and its arms to eye bolts in the side arms 5 of the fork. The length of the link should be such that the strut stands upright when the hay fork is horizontal, and the pivot of the strut is nearly midway between the pivot 10 of the fork and the point where the link connects with the rake-head.

Check ropes 21 are attached at their upper ends as at 22 to one of the cross bars of the fork-head and at their lower ends to springs 23, which latter in turn are attached to the rear cross bar 3 of the base; and the length of each check rope and its spring is such that the latter is put under tension when the rake is raised vertical, so that the contractile tendency of the spring starts the rake back to its original position immediately after it has thrown its load onto the stack. When the fork lies horizontal as shown in Fig. 1, these check ropes lie loose upon the base and on the ground and are entirely out of the way.

In order to hold the fork off the ground when the structure is being drawn from place to place, buttons 30 may be mounted on the sills 1 about as seen, and when these are turned outward under the long arms 5, the rear ends of the latter and the head of the fork are raised higher than as shown in Fig. 2. In order to adjust the position of the fingers 7 with respect to the tines 6, the braces 9 are linked at one end to such fingers and carry loops 31 at their other ends which are adjustably engaged by bolts or screws 32 in the outer sides of the arms 5.

With the above construction, the operation of this device is as follows:—When draft is applied to the rope 17, the strut turns on its pivot 12 and its head swings downward through a small arc to a point just forward of the pivot 10 of the fork. Meanwhile the link 20 causes the fork to rise until its arms 5 occupy an upright position at the front end of the machine as seen in dotted lines in Fig. 2. The line of draft is changed by the pulley 18 until it is obliquely downward as indicated by the arrows alongside the rope 17. This pull, through the instrumentality of the strut 11 is communicated to the links 20 on which the line of draft initially is upward as indicated by the arrow alongside the same in Fig. 2. The head of the strut moves forward and downward while the head of the fork moves upward and forward, soon the draft on the link 20 is directly forward in a horizontal line, a little later it is forward and downward, and eventually it is almost directly downward toward the pivot 10 of the fork as shown by the fact that the link eventually occupies a vertical position as seen in dotted lines. The result is, therefore, that while the draft starts the fork upward rather slowly, the interposition of the strut 11 which deflects the line of draft and rocks on a pivot other than that of the fork, causes the draft to have a continually increasing effect on the upward movement of the fork which is just what is desired for two reasons. First, the higher the fork rises, the nearer the load on its head approaches a position over its pivot and therefore the less the power needed to elevate it. Second, the nearer the fork approaches the vertical the faster it should move, so that, when it is checked in its upward movement, it will toss the load onto the pile. Neither of these conditions will be brought about by connecting the draw rope directly with the head of the fork. A substantially horizontal pull on the draw rope, if the latter rests close over the pivot 10, would hardly start the fork upward at all; and even if it did, it would start it upward more rapidly than it would complete its upward movement, and the tossing effect would be impossible.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent, is:—

In a hay stacker, the combination with a base including a pair of parallel sills connected at their extremities, a strut pivotally mounted upon said base and normally rising therefrom, a pulley on the front cross bar of the base, and rope leading from the head of the strut under said pulley and to a source of power; of a fork including side arms passing along side the sills and pivoted to them near their front ends and a head adapted to stand in rear of the base, the head made up of cross bars, tines, and pivoted fingers, braces pivoted to said fingers and having loops at their forward ends passing out side said side bars, screws in the latter engaging said loops for adjusting the position of the fingers with respect to the tines, a link connecting the head with the upper end of said strut, and buttons pivoted upon said sills and adapted to be turned outward under the fork-arms when the latter and the fork-head are raised.

In testimony whereof I affix my signature in presence of two witnesses.

WARREN FRANKLIN CLARK.

Witnesses:
G. KETTELSON,
JENNINGS TOOSKE.

Copies of this patent may be obtained for five cents each, by addressing the "Commissioner of Patents, Washington, D. C."